United States Patent [19]

Heinz et al.

[11] Patent Number: 5,250,619

[45] Date of Patent: Oct. 5, 1993

[54] PROCESS FOR THE PREPARATION OF HIGH MOLECULAR WEIGHT POLYAMIDES

[75] Inventors: Hans-Detlef Heinz; Helmut Schulte; Hans-Josef Buysch, all of Krefeld, Fed. Rep. of Germany

[73] Assignee: Bayer Aktiengesellschaft, Leverkusen, Fed. Rep. of Germany

[21] Appl. No.: 553,261

[22] Filed: Jul. 16, 1990

[30] Foreign Application Priority Data

Jul. 26, 1989 [DE] Fed. Rep. of Germany ....... 3924680
Jul. 26, 1989 [DE] Fed. Rep. of Germany ....... 3924681

[51] Int. Cl.⁵ .............................................. C08L 77/00
[52] U.S. Cl. ...................... 525/92; 525/183; 525/184; 525/424; 525/425; 525/432; 525/434
[58] Field of Search ................. 525/432, 184, 183, 92, 525/424, 425, 434

[56] References Cited

U.S. PATENT DOCUMENTS

| | | | |
|---|---|---|---|
| 3,551,548 | 12/1970 | Brignac et al. | 264/234 |
| 4,390,667 | 6/1983 | Aharoni et al. | 525/420 |
| 4,417,031 | 11/1983 | Aharoni et al. | 525/425 |
| 4,417,032 | 11/1983 | Khanna et al. | 525/432 |
| 4,760,129 | 7/1988 | Haering et al. | 528/487 |
| 4,861,838 | 8/1989 | Khanna et al. | 525/432 |

FOREIGN PATENT DOCUMENTS

| | | | |
|---|---|---|---|
| 234743 | 1/1960 | Australia | 525/432 |
| 0038094 | of 1981 | European Pat. Off. | |
| 0160337 | 11/1985 | European Pat. Off. | |
| 0034298 | 3/1976 | Japan | 525/432 |

*Primary Examiner*—Ana L. Carrillo
*Attorney, Agent, or Firm*—Connolly & Hutz

[57] ABSTRACT

This invention relates to a process for the preparation of particulate, high molecular weight polyamides, to the particulate, high molecular weight polyamides prepared by this process, to the use of these polyamides for the production of moulded bodies, especially by extrusion or blow moulding, and to the articles produced from the polyamides according to the invention. The process is characterized in that polyamides are mixed with concentrates of certain compounds containing phosphorus and worked up into granulates and these granulates are converted into high molecular weight products by solid phase after-condensation.

5 Claims, No Drawings

PROCESS FOR THE PREPARATION OF HIGH MOLECULAR WEIGHT POLYAMIDES

This invention relates to a process for the preparation of particulate, high molecular weight polyamides, to the particulate, high molecular weight polyamides prepared by this process, to the use of these polyamides for the production of moulded bodies, especially by extrusion or blow moulding, and to the articles produced from the polyamides according to the invention. The process is characterised in that polyamides are mixed with concentrates of certain compounds containing phosphorus and worked up into granulates and these granulates are converted into high molecular weight products by solid phase after-condensation.

Polyamides are a class of polymers which have been used for many years for numerous practical applications. They are prepared by various processes, are synthesized from widely differing starting materials, and for special applications can be made up into materials with specially adjusted combinations of properties, either alone or in combination with processing auxiliaries, stabilizers, polymeric alloying components (e.g. elastomers) or reinforcing materials (e.g. mineral fillers or glass fibres).

Numerous methods have become known for the preparation of the polyamides. Depending on the required end products, different monomer units are used for determining the matrix nature, different chain regulators are used for adjusting the required average molecular weight and in some cases monomers containing "reactive" groups are used when subsequent after-treatments are envisaged (e.g. amino groups or sulphonate groups for improving the dye absorption of fibres for acid or basic dyes).

The technically relevant processes for the preparation of polyamides proceed without exception via solvent-free polycondensation in the molten state (the hydrolytic polymerisation of lactams is also regarded as polymerisation of lactams is also regarded as polycondensation in this context). Owing to the very rapid increase in melt viscosity with increasing molecular weight, however, these processes can only be used for the preparation of relatively low molecular weight products since an excessively high melt viscosity gives rise to various problems.

Thus temperature control and removal of the water of reaction become progressively more difficult and the long reaction times at the high temperatures required leads to an increasing extent to side reactions and the formation of gel particles which may drastically impair the quality of the end product. Spinning also becomes progressively more difficult at very high melt viscosities.

Solid phase after-condensation (NK-Nachkondensation) provides substantial advantages in this context. Owing to the much lower reaction temperatures required (about 150° to 230° C., depending on the PA, compared with temperatures of 250° to 280° C. required for melt condensation), the risk of unwanted side reactions and gelling is reduced. Moreover, the fact that the material which is to be after-condensed consists of clearly defined particles with spaces between the particles combined with the possibility, in one variation, of keeping the granulate continuously in motion, e.g. in tumbler driers, enables a uniform reaction temperature to be maintained and the water of reaction to be removed. Since the product consists of particles, spinning problems do not arise.

Although the solid phase after-condensation process is used industrially on a large scale for the production of relatively high molecular weight polyamides, it does entail various disadvantages which have their origin in the relatively low speed of after-condensation. The conventional after-condensation process still requires a large amount of time and high energy consumption. Moreover, the cost of the installations required for the process is high owing to the considerable dwell time at the reaction temperature. Although the speed of after-condensation may be increased by raising the temperature, this again increases the extent of side reactions, gelling and other problems.

Increasing the speed of after-condensation by arbitrary increase in temperature is therefore no solution. On the contrary, the temperature should be kept as low as possible to avoid damage to the product.

Further, the molecular weights obtainable are limited since the viscosities of the products increase towards a plateau. Although the level of this viscosity plateau may be raised by increasing the temperature, this in turn gives rise to the problems already indicated above.

An increase in the after-condensation velocity may also be obtained by the application of a vacuum but it has been found that this invariably results in the absorption of oxygen, leading to discolouration of the product.

There is therefore a demand for a process which is technically easily controlled for the production of high molecular weight, particulate polyamides within short reaction times and under mild conditions.

The rapid production of high quality polyamides having a very high melt viscosity such as is required, for example, for the extrusion blow moulding of large hollow bodies such as motor car tanks would also be desirable.

A process has now surprisingly been found by which, starting with conventional, comparatively low molecular weight primary polyamides, high after-condensation velocities and/or very high molecular weights can be obtained. This is achieved by mixing these primary polyamides in the molten state with concentrates of special catalysts based on phosphorus, granulating the resulting phosphorus-containing, comparatively low molecular weight primary polycondensates, and then carrying out a conventional solid phase after-condensation of the granules. According to this invention, the process is characterised by an increase by at least 100% in the (initial) after-condensation velocity under the same conditions and/or by a marked increase in the final viscosities. Another surprising finding is that, depending on the initial molecular weight of the primary polyamide which is to be after-condensed, products having exceptionally high solution viscosities and distinguished by high long term viscosity in the molten state can easily be prepared by the process according to the invention.

This invention therefore relates to a process for the preparation of particulate, high molecular weight polyamides by solid phase after-condensation, characterised in that 1. comparatively low molecular weight, particulate polyamides are homogeneously mixed in the molten state with
2. at least one concentrate (master batch) prepared from
   2.1 at least one of the phosphorus compounds corresponding to the general formulae (I) to (V).

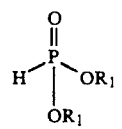

(I)

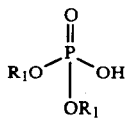

(II)

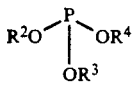

(III)

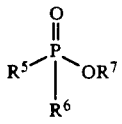

(IV)

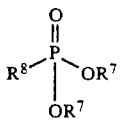

(V)

wherein the symbols $R_1$ denote, independently of one another, hydrogen or an (ar)alkyl group having 1 to 22 carbon atoms or an (alk)aryl group having 1 to 20 carbon atoms or metal atoms such as Na or K or $NH_4$ of from the corresponding oligomeric or polymeric homologues of I and II which may be open chain or cyclic and salts thereof (Na, $KNH_4$, etc.) or esters $R^2$–$R^4$ and $R^8$ independently of one another denote $C_{1-22}$-(ar)alkyl radical or a $C_{6-25}$-(alk)aryl radical $R^5$ and $R^6$ independently of one another denote H or an (ar)alkyl radical having 1 to 22 C atoms or an (alk)aryl radical having 6 to 25 C atoms, $R^7$ independently of one another denote hydrogen or metal atoms, such as Na or K, or $NH_4$, or are identical to $R^2$–$R^4$ and in which the radicals $R^5$, $R^6$ and $R^8$ may furthermore be polyvalent, so that more than one phosphorus atom may be present per molecule, and 2.2 thermoplasts which (preferably but not necessarily) melt or soften at the same temperature or at a lower temperature than the Polyamide 1, and the resulting homogenous melt is cooled and granulated and the granulate is after-condensed in the solid phase by the conventional procedure at temperatures of about 130° to 195° C.

The phosphorus content introduced with the concentrates 2, into the polyamide granulate which is to be after-condensed is from 5 to 300 pm, based on the polyamide granulate, and the (initial) velocity of after-condensation is higher by at least 100% than that of a catalyst-free polyamide.

The invention also relates to the polyamides prepared by the process according to the invention.

The following are examples of catalysts 2.1 to be used according to the invention: Phosphoric acid, diphosphoric acid, triphosphoric acid, polyphosphoric acids, sodium dihydrogen phosphate, disodium monohydrogen phosphate, ammonium phosphate, metapolyphosphoric acids, sodium, potassium and ammonium salts of polyphosphoric acids, phosphorous acid, diesters of phosphorous acid such as di-n-butylphosphite, di-n-phenylphosphite, di-n-decylphosphite and di-n-stearylphosphite, monoesters of phosphorous acid such as phosphorous acid butyl esters, phosphorous acid hexyl ester and phosphorous acid stearyl ester, phosphoric acid monoesters such as phosphoric acid decyl ester or phosphoric acid stearyl ester and diesters of phosphoric acid such as diphenylphosphate or distearylphosphate, monoesters of phosphonic acids such as methyl phosphonic acid phenyl ester or phenyl phosphonic acid stearyl ester, sodium hydrogen phosphite, triesters of phosphorous acid, such as triphenyl phosphite, tris(-nonylphenyl) phosphite, tris-(2,4-di-tert-butylphenyl) phosphite, tridecyl phosphite, tristearyl phosphite and tribehenyl phosphite, phosphonic acids, such as methylphosphonic acid and phenylphosphonic acid, biesters of phosphonic acid, such as diphenyl phenylphosphonate, mono- and disodium, potassium and ammonium salts of phosphonic acids, hypophosphorous acid and its salts, etc. Diphosphonic acids, such as ethane-1,2-diphosphonic acid, or polyvinylphosphonic acids, and their above-mentioned derivatives, are also suitable.

Particularly preferred catalysts are the phosphites of the formula (III) in particular the triaryl phosphites, and the phosphonic acids of the formula (V) or their mono-sodium, mono-potassium and mono-ammonium salts, as well as hypophosphorous acid and its sodium, potassium and ammonium salts. The examples given above are preferred catalysts.

Particularly preferred catalysts 2.1 are also phosphoric acid and their higher homologues (diphosphoric acid, etc.), the sodium, potassium and ammonium salts of these acids and phosphorous acid and its sodium, potassium and ammonium salts.

From the particularly preferred catalysts the following are mentioned individually: phosphoric acid and its higher homologues (linear or cyclic polyphosphoric acids) sodium dihydrogen phosphate, ammoniumphosphates, phosphorous acid, sodium hydrogen phosphite, potassium hydrogen phosphite, ammoniumphosphites and oligomeric or polymeric mono-sodium and mono-potassium salts of the mentioned polyphosphoric acids.

U.S. Pat. No. 3,551,548 discloses a process for the preparation of fibres with increased relative viscosity in which the fibres, which contain special phosphorus compounds, are prepared from the corresponding low molecular weight melt and are then after-condensed. In this process, the phosphorus compounds are to be used in quantities of from 0.01 to 15% by weight. The xamples show that significant after-condensation velocities and marked increases in molecular weights can only be obtained if a vacuum (risk of oxygen absorption with consequent degradation and discolouration) and high temperatures are employed at the same time. The process is therefore of little practical use.

The article, "Nylon 6 Polymerisation in the solid state" (R. J. Gaymans, J. Amirtharaj, H. Kamp; J. Appl. Polym. Sci. 27, 2513 (1982)) describes the solid phase after-condensation at 145° C. of Polyamide6 (use of hot nitrogen as heating medium and flushing gas) which has been prepared in the presence of 0.1% by weight of phosphoric acid. In this process, the initial after-condensation velocity is just as low as in the comparison experiment and viscosities higher than those of the comparison experiment are only obtained after relatively long after-condensation times.

The solid phase after-condensation at 180° C. of PA 6 which has been prepared in the presence of 0.288% by weight of $H_3PO_4$ is described by A. Mattiussi and G. B. Gechele, in Chim. Ind. 53, 662 (1971)). The initial velocity of the solid phase after-condensation is markedly increased but the velocity subsequently rapidly drops virtually to that of the comparison experiment. Although markedly higher viscosities are obtained, their values are always relatively low and the reaction times required at high temperatures for obtaining these elevated viscosities are disproportionately long (about 40 to 80 hours at 180° C.).

A two-stage process for the preparation of Polyamide 46 is disclosed in EP 0 038 094. A prepolymer is obtained in a first stage and is then after-condensed in the solid phase. The said document discloses that solid phase after-condensation (FPNK=Festphasennachkondensation) may be accelerated by the presence of $H_3PO_4$. Large quantities (0.1%) are used and solid phase aftercondensation must be carried out at very high temperatures, typically from 225° to 275° C.

None of these prior art processes can therefore be truly satisfactory since either very high temperatures and/or large quantities of catalysts and/or excessively long reaction times are required for achieving significant increases in reaction velocity and molecular weight.

These disadvantages of the state of the art are overcome by the process according to the invention since it enables the initial velocity to be drastically increased (e.g. by 500%) by simple means at relatively low reaction temperatures and with small quantities of catalyst and/or products with very $\eta_{rel}$ values, e.g. PA 6 with $\eta_{rel}$-8−10 and more (determined on a 1% solution in m-cresol at 25° C.) to be obtained by a simple method and with relatively short reaction times. The process according to the invention therefore constitutes a valuable enrichment of the state of the art.

According to the invention, a concentrate is first prepared from the catalyst 2.1 and the thermoplasts 2.2 which preferably but not necessarily melt or soften at the same temperature or at a lower temperature than the polyamide which is to be after-condensed. The following are examples of thermoplasts 2.2 which are suitable for the process according to the invention: PA 6, PA 66, 6/66 copolyamides, PA 11, PA 12, 6/11-copolyamides, PA 610, PA 1010, PA 1012, polyether amides, polyether ester amides, PA 1212, the following, optionally containing acid functions: polyethylene, polypropylene, polystyrene, styrene/acrylonitrile co-polymers, polymethylmethacrylate, thermoplastic polyurethanes, ethylene/propylene copolymers, copolymers of ethylene or propylene with higher α-olefines or acrylates, butadiene/styrene block copolymers, etc. The catalysts 2.1 should be used in quantities of about 0.05 to about 20% by weight, preferably from 0.2 o 10% by weight, more preferably 0.5 to 5% by weight, for the preparation of the concentrates 2, depending on requirement or on the thermoplast 2.2 used as vehicle.

The concentrates 2, may be prepared by various methods. They are generally prepared by mixing the thermoplast 2.2 with the phosphorus compounds 2.1 in the solvent-free molten state, preferably in extruders or kneaders. Fluidizing agents or plasticizers may be present for lowering the processing temperature. The molten concentrate is then spun in the usual manner and (preferably) granulated.

In special cases, especially when polyamides are used as concentrate vehicles 2.2, the concentrates may be obtained by the preparation (polycondensation or hydrolytic polymerisation) of the corresponding polyamides in the presence of the appropriate quantity of catalyst. Typical methods are given for both versions in the Examples section.

In a second step of the process according to the invention, the concentrates 2, are then mixed in the molten state with the polyamides which are to be aftercondensed, again preferably kneaders or extruders, and the polyamide melt containing catalyst is then spun in the usual manner and granulated. The concentrate 2, is used in such quantity at this stage that the polyamide granulate ready for after-condensation has a given phosphorus content. According to the invention, this phosphorus content is from 5 to 300 ppm, preferably from 10 to 200 ppm, most preferably from 20 to 100 ppm of phosphorus, based on the polyamide content. Mixing of the polyamide 1, which is to be after-condensed with the catalyst concentrated 2, is carried out in the temperature range typical for processing this polyamide.

The solid phase after-condensation (FPNK) is then carried out in the conventional manner. Temperatures of about 145° to 195° C., preferably 150°-190° C. and more preferably 160°-185° C., are suitable and the dwell times are in the range of from 1 to 100 hours, preferably from 2 to 50 hours, most preferably from 5 to 35 hours, the longer reaction times being preferably employed at lower temperatures and conversely.

For polyamides which melt in the given temperature range or slightly above it, the reaction temperature should always be at least 10° C., preferably at least 20° C. below the melting point. The solid phase after-condensation may be carried out continuously or batchwise in the usual apparatus, optionally with agitation of the granulate.

The process enables the solid phase after-condensation to be considerably accelerated, i.e., the FPNK velocity is increased by at least 100%, preferably at least 200% and more preferably at least 450%, by the process according to the invention and polyamides with very high molecular weights may be obtained.

The following are examples of suitable polyamides 1, for this invention: PA 6, PA 66, PA 46, PA 610, PA 11, PA 12, PA 1010, PA 1012, PA 1212, PA 6T6, PA 6I6 and copolyamides based on PA 66. The molar ratio of $NH_2$ groups to COOH end groups is generally not critical but the amounts should not differ too greatly from one another and the ratios are preferably in the range of from 15:1 to 1:15, especially from 8:1 to 1:8 and most preferably from 5:1 to 1:5.

The primary condensates 1, used have relative viscosities, determined on 1% solution in m-cresol at 25° C., of at least 2.4, preferably at least 2.7-2.8 and most preferably at least 3.3. The relative viscosity of these condensates should not be higher than about 5.5 and preferably not higher than 4.5.

PA 6, PA 66 and copolyamides based on PA 6 or PA 66 are preferred polyamides, PA 6 and copolyamides based on PA 6 are particularly preferred.

According to the invention, this solid phase aftercondensation process may be used, for example, for the preparation of PA 6 types of polyamides which have relative viscosities of 8-10, or more, but are still completely soluble in m-cresol, i.e., uncross-linked, and have a very light colour. This invention therefore relates in particular to high molecular weight polyamides having relative viscosities (see above) of at least 6, preferably at least 7.0, most preferably at least 7.5, prepared by catalysed solid phase after-condensation by the process according to the invention. The polyamides according to the invention are particularly suitable for extrusion processes, e.g. for blow-moulding large hollow bodies, or for the production of fibres. Their melt viscosities can be adjusted to almost any value by means of the catalyst concentration, the initial molecular weight, the temperature and the time. They therefore constitute a valuable enrichment of the state of the art. The addition of catalysts in the form of concentrates to the primary condensates to the primary condensates 1, provides the possibility of precise dosing and mixing. The calculated addition of catalyst to a finished polyamide separates the solid phase after-condensation from the process of melt condensation and renders the process according to the invention highly flexible.

According to the invention, the high molecular weight polyamides may contain conventional additives such as fillers and reinforcing materials (glass fibres, glass balls, carbon fibres, aramide fibres, mineral fillers, etc.), polymeric alloying components (preferably known impact strength modifiers for increasing the impact strengths at low temperatures and in the dry state, e.g. those based on polybutadiene, polyacrylate or ethylene/propylene copolymers and/or amorphous thermoplasts having glass temperatures of at least 80° C., preferably at least 110° C. and most preferably at least 150° C., which polymeric alloying components may be either compatible or incompatible and the resulting alloys may be monophasic or polyphasic), UV stabilizers, antioxidants, flame retardants, additives which reduce water absorption (preferably mono-, bis- and polyphenols or novolaks), lubricants, nucleating or anti-nucleating agents, pigments, dyes, mould release agents, fluidizing agents, etc. of the type described in the state of the art. These additives may, for example, be added to the starting materials for the synthesis of the primary polyamide or they may be incorporated with the catalyst concentrate or added immediately before processing, depending on the requirements and the type of additive.

If, for example, the additives used include fillers or reinforcing materials and/or polymeric alloying components which normally couple with the polyamide by way of amine or acid/anhydride functions, it may be advantageous for the purpose of obtaining exceptionally high molecular weights to adjust the end group ratios of the polyamide to particular values.

The process according to the invention provides a simple means of preparing high molecular weight and very high molecular weight polyamides in a relatively short time. After-condensation may also be carried out as required on a moulded part or a fibre but is preferably carried out on a conventional granulate.

The invention will now be illustrated with the aid of the following Examples without being limited thereto. $\eta_{rel}$-Values are determined on a 1% solution in m-cresol at 25° C.

EXAMPLES 1 and 2

Preparation of an $H_3PO_3$ or $H_3PO_4$ concentrate by extrusion

A low molecular weight Polyamide 6 ($\eta_{rel}$ about 2.9) and a methanolic solution of $H_3PO_3$ (Example 1) or $H_3PO_4$ (Example 2) were stirred together, the methanol was drawn off under a vacuum and the product was extruded through a single shaft extruder at 250° C.

Analytical data of the two concentrates are shown in Table 1.

EXAMPLE 3

Preparation of an $H_3PO_4$ concentrate by caprolactam polymerisation 10 kg of caprolactam, 600 ml of water and 112 g of an aqueous 85% $H_3PO_4$ were introduced into a 25 l autoclave and precondensed for one hour at 200° C. after the atmosphere had been equalized three times with $N_2$. The reaction mixture was then polymerised for 7 hours at 270° C. and cooled to 250° C. and the polyamide was spun off and granulated. Analytical data are shown in Table 1.

EXAMPLE 4

Preparation of an $H_3PO_4$ concentrate by compounding

Polyamide 6 having a relative viscosity of about 4.0 and an aqueous 85% phosphoric acid were separately introduced into a two-shaft extruder (Model ZSK 53), extruded at 230° C., spun off and granulated.

Analytical data are shown in Table 1.

TABLE 1

| Example | Catalyst | Quantity (%) Calculated | Quantity (%) Found experimentally[1] | $\eta_{rel}$ |
|---|---|---|---|---|
| 1 | $H_3PO_3$ | — | 1.3 | 2.4 |
| 2 | $H_3PO_4$ | — | 0.51 | 2.7 |
| 3 | $H_3PO_4$ | — | — | 2.4 |
| 4 | $H_3PO_4$ | 0.98 | 0.85/0.98 | 2.9 |

[1]determined by phosphorus analysis

EXAMPLES 5 to 9

Polyamide 6 granulate was mixed dry with various quantities of the $H_3PO_3$ concentrate prepared in Example 1 and extruded through a ZSK 53 double shaft extruder at 250° C. and a rate of throughput of 30 kg per hour. The product was spun off as a strand and granulated.

The granulate was condensed in a rotary evaporator (50 revs/min) at 170° C. in a stream of nitrogen of 40 l $h^{-1}$. The progress of after-condensation was followed by determining the $\eta_{rel}$ values. The data are summarized in Table 2.

EXAMPLES 10 to 13

$H_3PO_4$-modified PA 6 (concentrate described in Example 2) was prepared and after-condensed by the method described for Examples 5 to 9. The data are shown in Table 2.

COMPARISON EXAMPLE 1

The same granulate which was treated in exactly the same manner but was free from phosporus was after-condensed in the same manner. The data are shown in Table 2.

TABLE 2

| Example | Catalyst | Quantity (ppm P) | $\eta_{rel}$ (170° C., 40 l $h^{-1}$, 50 revs/min) 0 h | 3 h | 7 h | 14 h |
|---|---|---|---|---|---|---|
| 5 | $H_3PO_3$ | 11 | 2.95 | 3.1 | 3.8 | 4.6 |
| 6 | $H_3PO_3$ | 19 | — | 3.2 | 3.8 | 4.7 |
| 7 | $H_3PO_3$ | 30-31 | — | 3.5 | 4.6 | 5.3 |
| 8 | $H_3PO_3$ | 71 | — | 3.8 | 5.1 | 5.6 |
| 9 | $H_3PO_3$ | 124 | 3.1 | 4.6 | 5.4 | 6.2 |
| 10 | $H_3PO_4$ | 18 | — | 3.5 | 3.9 | 5.15 |

TABLE 2-continued

| Example | Catalyst | Quantity (ppm P) | $\eta_{rel}$(170° C., 40 l h$^{-1}$, 50 revs/min) | | | |
|---|---|---|---|---|---|---|
| | | | 0 h | 3 h | 7 h | 14 h |
| 11 | H$_3$PO$_4$ | 32 | 3.0 | 3.9 | 5.0 | 5.7 |
| 12 | H$_3$PO$_4$ | 59–60 | — | 4.4 | 5.7 | 6.15 |
| 13 | H$_3$PO$_4$ | 110 | 3.2 | 4.6 | 5.7 | 6.1 |
| Comparison 1 | — | — | 3.0 | 3.1 | 3.2 | 3.6 |

EXAMPLES 14 to 17 AND COMPARISON EXAMPLES 2 and 3

Polyamide 6 granulate ($\eta_{rel}$ about 3.5) was extruded at 270° C. by the method described for Examples 5 to 9 both with the H$_3$PO$_4$ concentrate obtained according to Example 4 and without catalyst.

Solid phase after-condensation was carried out as described for Examples 5 to 9 at 170° C. and 180° C. (Table 3).

EXAMPLES 18 AND 19 AND COMPARISON EXAMPLE 4

A polyamide 6 granulate ($\eta_{rel}$ about 4.0) was mixed with the H$_3$PO$_4$ concentrate prepared in Example 4 and extruded by the same method.

The solid phase after-condensation was carried out in the usual manner at 170° C. (Table 3).

EXAMPLE 20

150 kg of Polyamide 6 ($\eta_{rel}$ about 3.5) were extruded together with 2.55 kg of the concentrate prepared according to Example 3 through a ZSK 53 double shaft extruder at 20° C. and at a rate of throughput of 30 kg h$^{-1}$, spun off and granulated.

Solid phase after-condensation was carried out in the usual manner at 170° C. and 180° C. (Table 4).

EXAMPLE 21

50 kg of Polyamide 6 ($\eta_{rel}$ about 3.9) were extruded together with 0.85 kg of the same concentrate in the same manner.

Solid phase after-condensation was carried out as usual at 170° C. and 180° C. (Table 4).

EXAMPLES 22 AND 23

The granulate with viscosity $\eta_{rel}=3.8$ obtained in Example 14 (after-condensation time 0 h) was worked up into test rods measuring 80·10·4 mm.

One rod was placed either horizontally or upright in each of a number of ground glass pots and subjected to solid phase after-condensation in a drying cupboard (180° C., 20 l of N$_2$ per hour, 30 h).

The $\eta_{rel}$ values were 11.0 (horizontal) and 12.5 (upright).

EXAMPLE 24 (NOT ACCORDING TO THE INVENTION)

A concentrate (1% by weight) of 85% H$_3$PO$_4$ in polyethylene was prepared by the method described for Examples 1 and 2.

The theoretical phosphorus content is 0.27%.

EXAMPLES 25 AND 26 (NOT ACCORDING TO THE INVENTION)

PA 6 granulate ($\eta_{rel}$ about 1.9) was mixed dry with 2% of ammonium phosphate (Example 25) or 2% of sodium dihydrogen phosphate (Example 26) and the mixture was extruded through a single shaft extruder at 290° C.

The theoretical phosphorus content is 4160 ppm (Example 25) or 5170 ppm (Example 26).

EXAMPLES 27 TO 29

Polyamide 6 granulate ($\eta_{rel}$ about 4.0) was mixed at 270° C. by the method described for Examples 5 to 9 with given quantities of the concentrates prepared according to Examples 24 to 26.

The solid phase after-condensation was carried out as described for Examples 5 to 9.

The results are summarized in Table 4.

COMPARISON EXAMPLE 5

The polyamide 6 granulate used in Examples 27 to 29 was extruded without catalyst and after-condensed (Table 4).

TABLE 3

| Example | Catalyst | Quantity (ppm P) | $\eta_{rel}$ 170° C. | | | | $\eta_{rel}$ 180° C. | | | |
|---|---|---|---|---|---|---|---|---|---|---|
| | | | 0 h | 3 h | 7 h | 14 h | 0 h | 10 h | 20 h | 30 h |
| 14 | H$_3$PO$_4$ | 27–28 | 3.8 | 4.95 | 6.85 | 8.3 | — | — | — | — |
| 15 | H$_3$PO$_4$ | 42 | 3.9 | 6.1 | 7.9 | 9.5 | — | — | — | — |
| Comparison 2 | — | — | 3.6 | 3.9 | 4.1 | 4.25 | — | — | — | — |
| 16 | H$_3$PO$_4$ | 27–28 | — | — | — | — | 3.8 | 8.8 | 12.5 | 12.95 |
| 17 | H$_3$PO$_4$ | 42 | — | — | — | — | 3.9 | 9.1 | 13.5 | 14.2 |
| Comparison 3 | — | — | — | — | — | — | 3.6 | 4.3 | 4.7 | 4.85 |
| 18 | H$_3$PO$_4$ | 26–27 | 4.1 | 5.8 | 8.2 | 9.3 | — | — | — | — |
| 19 | H$_3$PO$_4$ | 41 | 4.1 | 6.65 | 9.25 | 9.9 | — | — | — | — |
| Comparison 4 | — | — | 4.0 | 4.3 | 4.4 | 4.5 | — | — | — | — |

TABLE 4

| Example | Catalyst | Quantity (ppm P) | $\eta_{rel}$ 170° C. | | | | | $\eta_{rel}$ 180° C. | | | | |
|---|---|---|---|---|---|---|---|---|---|---|---|---|
| | | | 0 h | 10 h | 15 h | 20 h | 30 h | 0 h | 10 h | 15 h | 20 h | 30 h |
| 20 | H$_3$PO$_4$ | 40 | 3.85 | 9.3 | 9.7 | 10.1 | 11.0 | 3.84 | 11.4 | 12.1 | 12.5 | 13.5 |
| 21 | H$_3$PO$_4$ | 45–46 | 3.5 | 8.4 | 9.2 | 9.8 | 10.8 | 3.5 | 10.0 | 11.1 | 11.8 | 12.7 |

EXAMPLE 30 AND COMPARISON EXAMPLE 6

A Polyamide 6 ($\eta_{rel}$ about 4.0) reinforced with 30% of glass fibres was prepared in a ZSK double shaft extruder at 270° C. and a rate of throughput of 30 kg per hour. In one case (Example 30) 1.5%, based on the polyamide content, of the concentrate from Example 3 was added and in another case (Comparison 6) no concentrate was added.

After-condensation was carried out in the usual manner at 170° C., 50 revs/min, 40 l of N$_2$ per hour (Table 5).

EXAMPLE 31 AND COMPARISON EXAMPLE 7

An impact resistant Polyamide 6 ([R]Durethan BC 30, a product of Bayer AG) was extruded, once without and once with 1.5% of the concentrate from Example 3, through a ZSK 53 double shaft extruder at 260° C. and a rate of throughput of 30 kg per hour.

After-condensation was carried out as described in Example 30 (Table 5).

EXAMPLE 32

A mixture of polyethylene (Baylon ®, a product of Bayer AG) and 3% of triphenyl phosphite were mixed at 250° C. in a single-screw extruder, spun into a water bath and granulated. The theoretical phosphorus content is 3000 ppm.

EXAMPLE 33

A masterbatch of polyethylene and 5% of trialkyl phosphite, synthesised from triphenyl phosphite and 3 mole of a fatty alcohol (Alfol ® 1620, a product of Condea Chemie GmbH) was prepared in the same manner. The theoretical phosphorus content is about 1350 ppm.

EXAMPLES 34 and 35

Masterbatches of 3% of triphenyl phosphite (Example 34) and 5% of the fatty alcohols phosphite used in Example 33 (Example 35) in polypropylene are prepared in the same manner.

The theoretical phosphorus contents are 3000 ppm (Example 34) and 1950 ppm (Example 35).

EXAMPLE 36

A masterbatch of polyethylene and 3% of tris-(2,4-di-tert-butylphenyl phosphite) Fogafos 168, a product of Ciba-Geigy) was prepared in the manner described for Example 32 and 33.

The theoretical phosphorus content was 1900 ppm.

EXAMPLE 37–41

The masterbatch prepared in Examples 32–36 were dry-blended with PA 65 ($\eta_{rel}$=4.0) granules, and mixed in a ZSK 53 twin-screw extruder at 270° C. and with a throughput of 30 kg h$^{-1}$.

The solid-phase postcondensation was carried out in a rotating vessel at 170° C. (for 0, 3, 7 and 14 h) at 50 rpm and with 40 l of N$_2$ per hour.

The composition of the samples and the results of the solid-phase postcondensation are shown in Table 6).

COMPARATIVE EXAMPLE 8

The pure PA 6 granules were subjected to postcondensation in the same manner (Table 6).

TABLE 4

| Example | Concentrate according to Example [% by weight based on polyamide] | P (theor.) [ppm] | $\eta_{rel}$ 0 h | 3 h | 7 h | 14 h |
|---|---|---|---|---|---|---|
| 27 | 1.62 | 24 | 4.2 | 4.9 | 6.5 | 8.0 |
| 28 | 1.64 | 25 | 4.0 | 4.7 | 7.15 | 8.6 |
| 29 | 1.26 | 26 | 4.2 | 5.6 | 7.7 | 9.13 |
| Comparison 5 | — | — | 4.1 | 4.1 | 4.3 | 4.5 |

TABLE 5

| Example | Concentrate from Example [% by weight] | $\eta_{rel}$ 0 h | 3 h | 7 h | 14 h | $V_{NK}$[1] [h$^{-1}$] | $V_{NK}$[2] rel. |
|---|---|---|---|---|---|---|---|
| 30 | 1.05 | 3.9 | 4.3 | 4.6 | 5.15 | 0.089 | 3.1 |
| Comparison 6 | — | 4.0 | 4.2 | 4.3 | 4.4 | 0.028 | 1 |
| 31 | 1.15 | 2.8 | 3.4 | 4.5 | — | 0.24 | 6.8 |
| Comparison 7 | — | 2.75 | 2.9 | 3.0 | — | 0.035 | 1 |

[1])Velocity after the after-condensation: Example 30, Comparison 6 = > 14 h; Example 31, Comparison 7 = > 0 – 7 h
[1]) Relative after-condensation velocity based on the comparison

TABLE 6

| Example | Concentrate according to Example [% by weight, relative to PA] | Theoretical P content [ppm] | $\eta_{rel}$ 0 | 3 | 7 | 14 h |
|---|---|---|---|---|---|---|
| 37 | 1.66 | 1 | 48.9 | 4.3 | 4.6 | 6.8 | 8.7 |
| 38 | 2.78 | 2 | 52.8 | 4.2 | 4.5 | 6.1 | 7.3 |
| 39 | 1.66 | 3 | 48.9 | 4.2 | 4.3 | 5.6 | 7.1 |
| 40 | 2.78 | 4 | 52.8 | 3.9 | 4.45 | 5.2 | 6.4 |
| 41 | 2.62 | 5 | 49.7 | 4.2 | 5.1 | 5.8 | 7.7 |
| Comparison 8 | — | | | 4.05 | 4.1 | 4.3 | 4.5 |

EXAMPLE 42

9 kg ε-caprolactam and 1 kg ε-aminocaproic acid are filled into a 25 l autoclave. After filling with nitrogen, the autoclave content was heated to 200° C. under its own pressure. After 1 hour at 200° C. and release of pressure, the content was heated to 270° under passage of nitrogen-gas with a rate of 40 l N$_2$/hour.

After 2 hours the intended melt viscosity was reached and the melt was spun into a waterbath. The extrudate was dropped into granules and extracted with hot water for 24 hours.

After drying the product had an endgroup content of 0,07 weight % NH$_2$-groups and 0,095 weight % COOH-groups. The relative viscosity was 3.1.

EXAMPLE 43

The experiment of example 42 was repeated, but additional 33,5 g of 75% by weight of aqueous solution of hexamethylene diamine was added to the reactants. After a reaction time of 3–4 hours the polyamide had a relative viscosity of 2.9–3.0, the endgroup content was 0.106% by weight NH$_2$-groups and <0.05 weight % COOH-groups.

EXAMPLES 44 AND 45

Each of the polyamides of examples 42 and 43, were compounded with 10% of an ethylene/acrylic ester/acrylic acid-terpolymer (Lucalen ® 2920M, a product of BASF-AG, D 6700 Ludwigshafen/West Germany) and with 1,5% by weight of a concentrate according example 3, by passage through a double screw extruder (ZSK-53) at 250° C. and a rate of 30 kg per hour. The granulates of these polyamide mixtures were postcondensed (see table 7).

COMPARISON EXAMPLES 9 AND 10

In the same manner as the examples 44/45, compounds without phosphorus containing concentrates were produced and postcondensed (see table 7).

TABLE 7

| Example | Polyamide of Example | $H_3PO_4$-Conc. [% by weight] | $\eta_{rel}$ | $\eta_{rel}$ at 170° C. | after + [h] at T [°C.] at 180° C.: | | | | |
|---|---|---|---|---|---|---|---|---|---|
| | | | | | 3 | 7 | 14 h | 5 | 15 h |
| 44 | 42 | 1.5 | 3.3 | | 4.25 | 6.25 | 7.1 | 6.4 | 8.2 |
| 45 | 43 | 1.5 | 3.05 | | 3.0 | 3.8 | 4.5 | 4.5 | 5.2 |
| Comp. 9 | 42 | — | 3.3 | | 3.5 | 3.7 | 4.6 | 3.65 | 4.1 |
| Comp. 10 | 43 | — | 3.1 | | 3.1 | 3.1 | 3.1 | 3.3 | 3.4 |

As shown in the Examples, the velocity of solid phase after-condensation can be drastically increased by the process according to the invention and products having very high molecular weights may be obtained.

It may be of advantage in some cases (e.g. with elastomer-modified polyamides) to use certain endgroups relations ($NH_2$/COOH)-compare the slower reaction of polyamide 43 with higher $NH_2$-concentration, as compared to polyamide 42.

By regulation of the $NH_2$/COOH-endgroups a postcondensation effect (as seen in the increase of relative viscosities) can be regulated.

We claim:

1. Process for the preparation of particulate, high molecular weight polyamides by a catalyzed solid phase after-condensation reaction characterized in that
    A. low molecular weight, particulate polyamides having relative viscosities (1% by weight solution in m-cresol; 25° C.) in the range of from 2.4 to 5.5 are homogeneously mixed in the molten state with
    B. at least one concentrate comprising
        B.1 at least one phosphorus compound as catalyst for the after condensation reaction corresponding to the formulae (I) to (V)

 (I)

 (II)

 (III)

 (IV)

 (V)

wherein the symbols $R_1$ denote, independently of one another, hydrogen or an (ar)alkyl group having 1 to 22 carbon atoms or an (alk)aryl group having 6 to 20 carbon atoms or alkali metal atoms or $NH_4$ and $R^2$–$R^4$ and $R^8$ independently of one another denote $C_{1-22}$-(ar)alkyl radical or a $C_{6-25}$-(alk)aryl radical $R^5$ and $R^6$ independently of one another denote H or an (ar)alkyl radical having 1 to 22 C atoms or an (alk)aryl radical having 6 to 25 C atoms.

$R^7$ independently of one another denote hydrogen or alkali metal atoms or $NH_4$, or are identical to $R^2$–$R^4$ and B.2 a thermoplast selected from the group consisting of PA 6, PA 66, 6/66-copolyamides, PA 11, PA 12, 6/11- and 6/12-copolyamides, PA 610, PA 1010, PA 1012, polyether amides, polyether ester amides, PA 12/12, polyethylene, polypropylene, polystyrene, styrene/acrylonitrile copolymers, polymethyl methacrylate, thermoplastic polyurethanes, ethylene/propylene copolymers, copolymers of ethylene or propylene with higher alpha-olefins or acrylates, and butadiene/styrene block copolymers, wherein the melt of A and B is cooled and granulated and the granulate is after-condensed in the solid phase at temperatures of about 145° to 195° C., the phosphorus content of the after-condensed polyamide granulate being in the range of from 5 to 300 ppm, based on the polyamide content, and the reaction rate of the after-condensation reaction being higher by at least 100% than that of a catalyst free polyamide, and, if the thermoplast B.2 is a polyamide, preparation of the concentrate B. is carried out by the polycondensation or polymerization of the polyamide-forming starting materials in the presence of the corresponding quantity of catalyst B.1.

2. Process according to claim 1, characterized in that the catalyst B.1 used is selected from the group consisting of phosphoric acid and its higher homologues and the sodium, potassium and ammonium salts thereof, phosphorous acid and its sodium potassium and ammonium salts, triesters of phosphorus acid, phosphonic acids, phosphonates, phosphonic acid salts, hypophosphorous acid and its salts (Na, K or NH$_4$) or esters, diphosphonic acids, and polyvinylphosphonic acids.

3. Process according to claim 1, characterised in that the catalysts B.1 are used in quantities of from 0.05 to 20% by weight, for the preparation of concentrates B. and in that after the polyamide A has been mixed with the concentrate B. the phosphorus content of the after-condensed polyamide granulate is from 5 to 300 ppm, based on the polyamide content.

4. Process according to claim 1, characterised in that the solid phase after-condensation is carried out at temperatures of about 145° to 195° C. at dwell times of from 1 to 100 h.

5. Process according to claim 1, characterized in that the polyamides A. are PA 6 or copolyamides based on PA 6.

* * * * *